Figure 1:
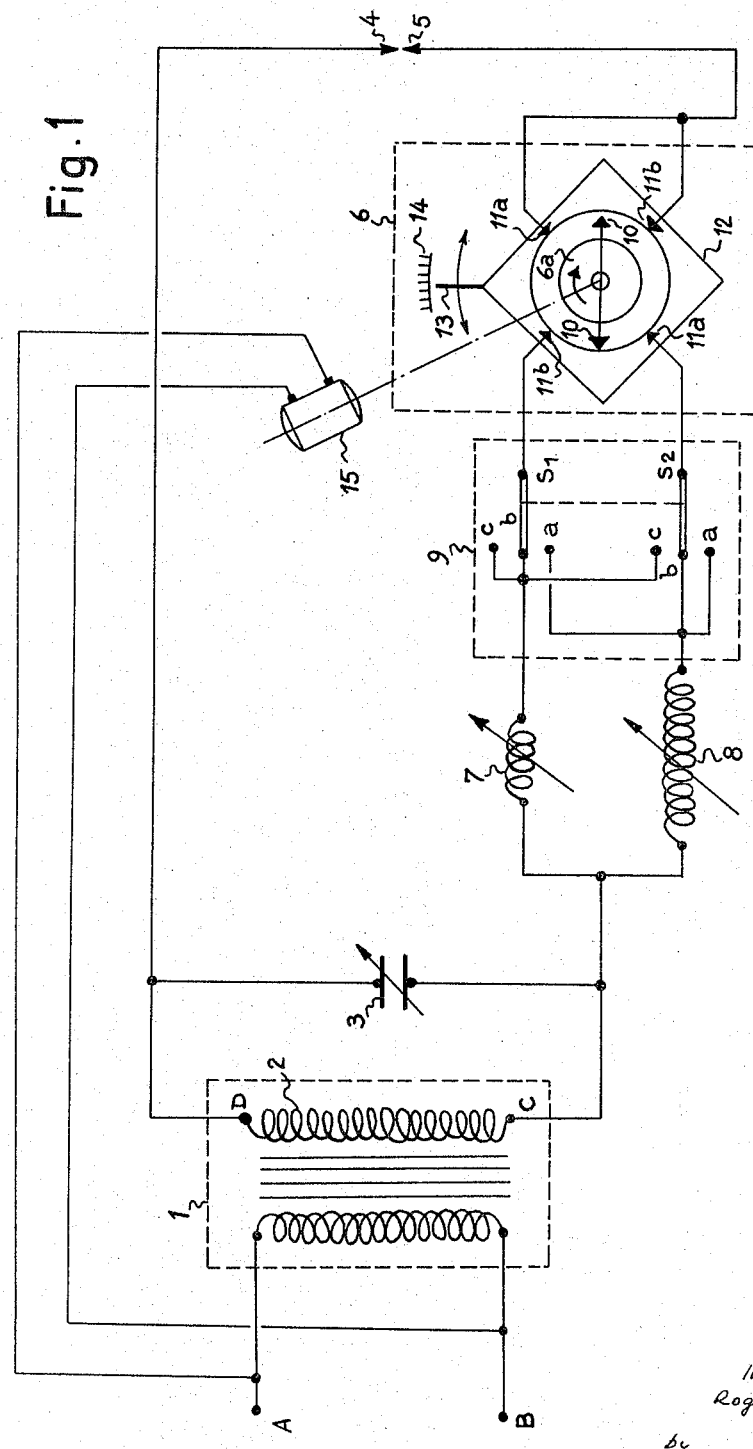

INVENTOR
ROGER BERNERON

United States Patent Office 3,308,339
Patented Mar. 7, 1967

3,308,339
METHOD AND APPARATUS FOR PRODUCING RADIATION FOR SPECTROMETRIC ANALYSIS
Roger Berneron, Saint-Germain-en-Laye, France, assignor to Institut de Recherches de la Siderurgie Francaise, Saint-Germain-en-Laye, France
Filed July 9, 1963, Ser. No. 293,798
Claims priority, application France, Aug. 6, 1962, 906,179, Patent 1,337,846
4 Claims. (Cl. 315—172)

The present application concerns a method and an apparatus to be used in connection with the spectrometric analysis of materials, and more specifically a method and an apparatus for producing the required radiation by means of electric discharges between electrodes comprising material to be spectrometrically analyzed.

In the spectrometric analysis of specimens of materials, particularly by means of spark discharges between electrodes, it is often necessary to take into consideration the intensities of spectral rays whose corresponding levels of excitation differ greatly. For instance, the level of excitation corresponding to the spectral line at 2,296 A. of carbon $C_{III}$ corresponds to a level of excitation at 53 electron-volts, and the spectral line at 2,516 A. of silicon $Si_I$ has a level of excitation amounting only to 5 electron-volts.

Now, the emission of a radiation having a high potential of excitation calls for an electric discharge of great momentary power and the emitted light radiation unavoidably gives rise to a continuous spectrum forming a background against which those lines or portions of the spectrum which are simultaneously emitted but have a low potential of excitation can be hardly detected or measured with accuracy in view of their low intensity, and in many cases they cannot be discovered at all. Returning to the above mentioned example of carbon and silicon, it can be stated that it becomes impossible to provide for a suitable intensity of the different radiations if only one type of discharge intensity is used, provided that the specimen contains less than 0.2% of silicon.

Thus it is well possible that the analysis of a particular specimen may make it necessary to carry out a plurality of consecutive operations differing from each other by the different types of electric discharge used. For instance, one such operation may have to be carried out for detecting elements which are characterized by radiation the emission whereof requires discharges of great momentary power, and another operation may apply to those elements the corresponding spectral lines whereof occurs at lower potentials of excitation so that one obtains a useful spectrum with electric discharges with lower peak power, i.e. which are more spread out in time, or even with discharges of lower potential.

In order to reduce the number of operations and in order to improve the precision of the spectral measurements, it has been proposed to subdivide a spectrum produced during an individual discharge into fractional momentary spectra. This means, one transmits and observes spectral radiation only during very brief partial periods of each individual discharge. This can be done for example with the aid of a rotating mirror or by means of a shutter mechanism which periodically interrupts the path of the luminous radiation, or finally, if photo-electric detectors are used, by means of an electronic commutator.

While this system entails certain advantages regarding the evaluation of the spectra produced thereby, it nevertheless does not eliminate certain difficulties which are characteristic of the production of the discharges. These difficulties affect the accuracy of the results of the spectrometric analysis and are due mainly to the heating up of the electrodes and to the resulting formation of globules on their surface whereby a progressive modification of the emission characteristics of the discharges are caused during each test procedure.

It is therefore one object of this invention to provide for a method and an apparatus for producing radiation for the spectrometric analysis of a material by means of electric discharges, but free of the difficulties and drawbacks of the known systems.

It is another object of this invention to provide for a system as set forth by which the accuracy and sensitiveness of the analysis is improved.

It is another object of this invention to provide for a system of the type set forth by which the procedure of sub-dividing a spectrum into a sequence of momentary partial spectral elements is improved.

With above objects in mind the invention includes a method of producing radiation for the spectrometric analysis of a material, comprising the steps of producing a sequence of electrical discharges between electrodes, the discharges of said sequence being effected consecutively according to different types of discharges, and reproducing identically said sequence at least one time.

In another aspect, this invention includes in an apparatus for producing radiation for spectrometric analysis of a material by means of electric discharges between electrodes, in combination, input means for applying to the electrodes an alternating voltage of predetermined frequency and adapted to produce discharges between said electrodes; circuit means arranged between said input means and said electrodes and comprising a plurality of impedance means of respectively different impedance values, and control means for sequentially and in periodic repetition placing said different impedance means, respectively, in circuit with said electrodes; and actuating means for actuating said control means in synchronism with said predetermined frequency of said alternating voltage, so that the types of said electric discharges are caused to form a sequence which is periodically repeated.

The invention further includes also the following features.

The circuit comprising the electrodes may be supplied by at least one source of alternating current, and the sequences of discharges of different types may be produced in synchronism with the frequency of the alternating current supply.

One may periodically connect in the electrodes supply circuit different impedance members in cyclic repetition, each of these different impedances corresponding respectively to a different type of discharge as may be desired. The selected impedance elements remain in the electrode supply circuit during a plurality of consecutive discharges.

One may also connect periodically the electrode supply circuit with different current sources.

It should be understood that the terms "synchronized" and "in synchronism" as used above and hereinafter in the specification and in the claims are intended not only to define a situation where the frequency of the alternating current supply is the same as that of the discharges but also those conditions where the ratio between the two frequencies is an integer number.

It will be understood that by producing discharges of alternatingly different types of which one mainly produces radiation of high energy while the others produce e.g. only low energy level radiation, one can obtain in a unitary spectrum all the desired spectral lines or wavelengths with a specific intensity which favors the radiations of low excitation potential, and also a spectral background of substantially reduced intensity.

Moreover, at a uniform repetition frequency of the discharges the heating up of the electrodes and the formation of globules at their surface are reduced and consequently the stability of the emission of radiation and the accuracy of the results of the analysis are improved.

If one designates with the letters A, B, C, respectively, discharges of three different types or intensities, then the method according to the invention may be considered as being characterized by the production of sequences of discharges which discharges are arranged within the particular sequence for instance in the order A, C, B, or only as A, B, or finally in the order A, A, B, C. The types of discharges A and B may be for example high-frequency spark discharges damped differently, and the discharges C may be arc discharges.

According to one modification of the invention the production of high-frequency spark discharges of different degrees of damping may comprise the successive introduction of inductances of different values into the discharge circuit including the electrodes. Also, for alternatingly producing arcs and sparks the periodic change between different inductances may be supplemented by intercalated changes of capacitance and of current supply (or simply, by changes in the means of supply of energy to the electrodes).

It must not be overlooked that all the periodic connections and changes thereof must be done and completed at the moment when a discharge is started.

In order to obtain the desired results a comparatively simple arrangement may be used as will be described now in broad terms. A plurality of different impedance elements, e.g. inductance coils, may be connected with the different conductive paths, respectively, of a commutator which may be of the electro-mechanical or the electronic type. The commutator is operated in synchronism with the means of control of the discharges or, which is even preferable, may control itself the discharges. For the alternating production of arcs and sparks a second supply circuit which may be fed by a separate source, may be connected with the above mentioned commutator, or with a second commutator synchronized with a first one, in such a manner that the different supply circuits are alternatingly connected with the electrodes.

Although the arrangement according to the invention may be constructed also for being supplied with direct current as well as with alternating current, the following description of details refers only to the embodiment which is adapted for being supplied with alternating current since this latter form of apparatus is the most practical one.

A generator for high frequency sparks comprises according to the invention a step-up transformer and a capacitor supplied by this transformer with charging potential, one terminal of this capacitor being connected with one of the electrodes while the other terminal is connected with the common point of a plurality of circuit branches, each of these branches comprising a different inductance member to correspond to a different spark type or intensity. The opposite ends of the various inductance members are respectively connected with different terminals of a periodic high voltage commutator which connects these different inductances successively with the other electrode every time the charge potential of the above mentioned capacitor reaches a predetermined value.

The periodic commutator mentioned above may consist e.g. of an assembly of electronic devices as for instance of discharge tubes of the thyratron type, or of a plurality of spark gap devices which are actuated successively. For example, this spark gap type commutator may comprise a plurality of stationary spark electrodes spaced from each other along a circle at equal intervals, and a rotary set of counter-electrodes which during rotation along said circle pass consecutively through positions in which a spark is able to form between at least one pair consisting of a stationary and a rotating spark electrode. The rotary set of spark electrodes is to be driven in synchronism with the frequency of the alternating current supply source.

In order to make it possible that an arrangement as described above produces, if desired, alternatingly high voltage sparks and low voltage arc discharges, the basic circuit arrangement is supplemented by a conventional arc producing circuit which is supplied with the primary voltage of the transformer and is connected with the electrodes by an electro-mechanical circuit-breaker actuated in synchronism with the supplying alternating current. This type of circuit-breaker could be replaced by high voltage diodes, the polarity of the resulting arc being determined by the polarity with which the diodes are placed in the circuit.

Without departing from the basic concept of the invention one could also operate with sources of polyphase currents, each phase feeding in this case a different circuit and each of these circuits being connected successively or alternatingly with the discharge electrodes in synchronism with the successive alternations of the polyphase current which can be achieved by means of a conventional commutation device.

In order to fully benefit from the advantages yielded by the method and arrangement according to the invention it is recommended to sub-divide the spectrum into fractions thereof which correspond respectively to the different types of dicharges, in such a manner that in the total spectrum the best possible relations exist between specific desired spectral lines or portions and the general spectral background. The just mentioned sub-division of the spectrum will be much more readily achieved than it was in the case of the conventional method of sub-dividing a spectrum into monetary partial spectra. As a matter of fact, according to the invention the radiations corresponding to the different types of intensities of discharge are transmitted and observed during the entire duration of the luminous emission, in contrast to the conventional system according to which the radiations are transmitted and observed only during very brief fractions of time of the discharge.

Therefore one could for instance utilize in connection with the system according to the invention a rotating disc placed before the input slit of a stigmatic spectrograph and provided with openings in the form of circular sectors cut out at different radial distance from the center of rotation, each radius corresponding to one of the respective types or intensities of discharge. The magnitude of the center angles encompassing the individual openings is not critical and would not matter if the time during which an individual opening passes radiation is greater than the duration of the respective discharge, provided that the radiation passage is blocked again before the start of the next following discharge at a different intensity or of a different type. It is understood that with the aid of a spectrograph thus equipped the selected different fractions of the spectrum which are passed through the different openings of the rotating disc appear at different heights so that they can be distinguished and observed as well as recorded separately from each other without any difficulty.

It is advisable that the number of the openings cut in the rotating disc is equal to the number of the different current paths of the commutator which consecutively places the different impedance devices in circuit, and that the disc is rotated in synchronism with the commutator.

If in the spectrometric or spectrographic apparatus the detector devices are photo-electric elements, then it is also possible to utilize for the separation or sub-division of the spectrum into spectral fractions electronic commutation devices of the type which is well known in the art since they are used for sub-dividing a spectrum into brief periods with every discharge as mentioned further above. The commutation devices must evidently be synchronized with the changes of the type or intensity of the discharges and serve to transmit the signals furnished by the photo-electric receiving elements to the amplifiers, integrators or other read-out devices which are distinct from each other in view of and depending upon the above mentioned signals as they are derived from one or the other type or intensity of discharge. In the case where the succession of different types or intensities of discharge is controlled by a rotary type spark gap device, a very simple means of obtaining the above-mentioned synchronization consists in controlling the above-mentioned electronic commutation devices by means of a commutator which is driven by the same motor as the spark gap type commutator, or by means of a photo-electric cell which is exposed to an auxiliary luminous flux modulated by a rotary shutter driven by the same motor. The relative angular position of this commutator or of the rotary shutter relative to the rotating spark gap commutator renders the regulation of the precise instant of commutation relative to the particular discharge very simple.

Figure 2:
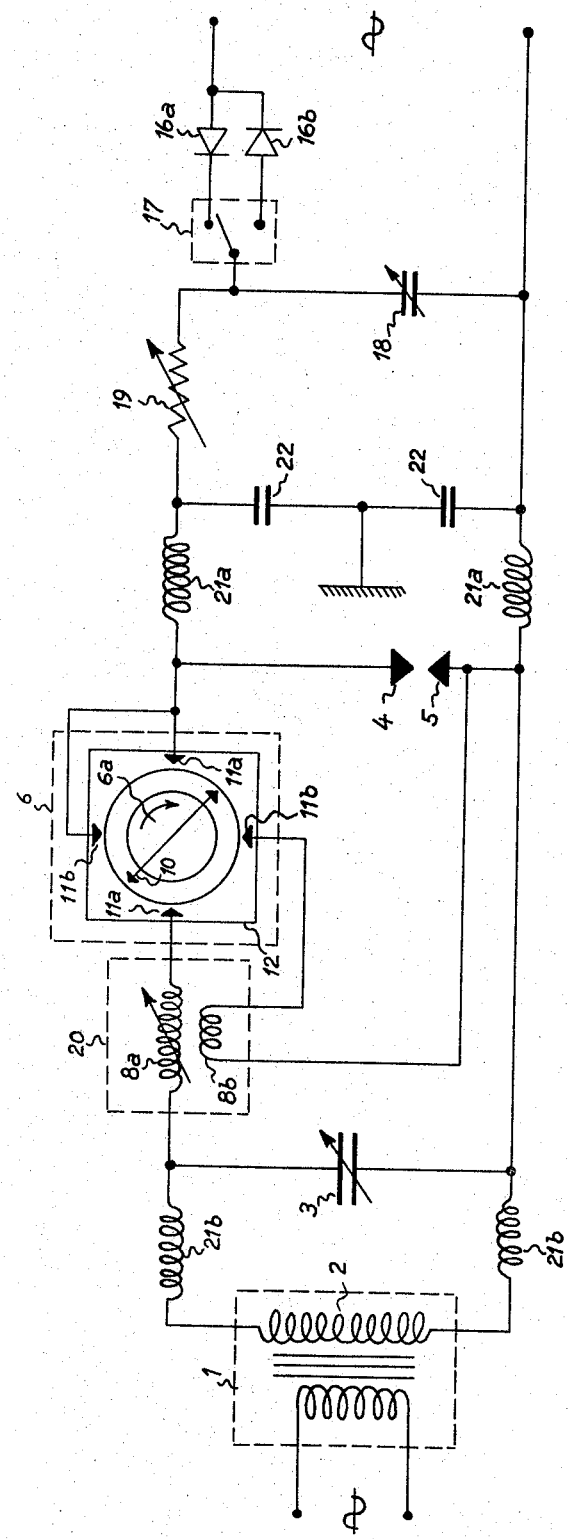

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of an arrangement according to the invention for generating high voltage sparks of respectively different intensities; and FIG. 2 is a similar schematic diagram illustrating another embodiment of the invention including means for alternatively producing high frequency sparks and low voltage arcs.

FIGS. 1 and 2 will serve to illustrate both the method and the apparatus according to the invention.

As FIG. 1 shows, the arrangement comprises a generator for producing spark dicharges alternatingly damped to different degrees i.e. having alternatingly different intensities. A step-up voltage transformer 1 is connected on the primary side with a supply network furnishing to the input terminals A and B 220 volts alternating current at 50 cycles. The output voltage of the transformer 1 available at the output terminals C and D of the secondary winding 2 is 5,000 volts. A capacitor 3, preferably of the variable type, is connected with the secondary of the transformer 1 for being charged and discharged with every alternation of the supply current. The discharge current passes through the discharge electrodes 4 and 5 producing the radiation for the spectrometric analysis, and then proceeds through a rotary type spark gap commutator 6 described further below, and thereafter once through a low inductance 7 and once through a high inductance 8 provided that the two-pole selector switch 9 is in the position as illustrated where the switch arms $S_1$ and $S_2$ are in engagement with the stationary contacts $b$. However, in a different position of this selector switch only one or the other of the inductances 7 and 8 will be in operative circuit connection.

The discharge electrodes 4 and 5 comprise small rods of the material specimen to be analyzed. The gap between the electrodes 4 and 5 is about one millimeter. The rotary spark gap commutator 6 comprises a rotating disc 6a made of insulating material and carrying at its periphery two spark electrodes 10 disposed diametrically opposed to each other and conductively connected with each other. As this disc with the electrodes 10 is rotated by the motor 15 e.g. in the direction of the arrow the electrodes 10 pass through positions in which they face either the stationary electrodes 11a or the stationary electrodes 11b and in each of these positions a spark passing through the gaps of the device 6 initiates a discharge across the discharge electrodes 4 and 5. The stationary spark electrodes 11a and 11b are mounted on a frame 12 made also of insulating material and kept in stationary position. However, the phase angle of the successive spark discharges in the commutator 6 may be adjusted by angularly displacing the frame 12 about its center, which angular displacement can be determined and adjusted easily by referring to the position of an index 13 relative to a graduation 14. The motor 15 driving the rotary disc 6a is a synchronous motor rotating at 1500 r.p.m. and is supplied directly from the outside source of alternating current via the input terminals A and B.

As can be seen the selector switch 9 has two switch arms $S_1$ and $S_2$ respectively connected with the commutator 6 and manually operable so as to be placed in any one of three different positions.

When the commutator 9 is in the illustrated position where the switch arms are in engagement with the stationary contacts $b$ the intensities of the spark discharges across the discharge electrodes 4 and 5 will be varied alternatingly depending upon which one of the inductances 7 and 8 is in circuit with the discharge electrodes 4 and 5 at the moment of the discharge. For instance, the inductance 7 may have a very low value of 10 microhenries and permits of a spark discharge of very great momentary power. The inductance 8 has a greater value of e.g. 500 microhenries and permits the obtaining of more extensive oscillatory discharges across the electrodes 4 and 5. The two inductances 7 and 8 may be adjustable in a conventional manner e.g. by shunting a certain number of turns of their windings.

Certain spectrometric analyses call only for the emission of a radiation the level of energy whereof is of a selected value remaining constant throughout the test. Therefore it is useful to provide the arrangement according to the invention with means for operating with only one type or intensity of discharge. For this reason the manually operable commutator 9 also permits the placing of the switch arms alternatively either in a position where they engage the stationary contacts $a$ or in a position in which they engage the stationary contacts $c$. As can be seen in these positions either only the inductance 7 or only the inductance 8 will be operative during a sequence of dicharges across the electrodes 4 and 5.

The capacitor 3, preferably adjustable, symbolically represents a bank of capacitors of which a variable number may be connected in parallel so that the discharge energy can be adjusted to the specific requirements of one or the other analysis, and for instance also for utilizing this circuit for initiating arc discharges by means of high frequency sparks of low energy.

The embodiment according to FIG. 2 represents a double generator which alternatively produces damped or low intensity high-frequency sparks and low voltage arcs between the same discharge electrodes 4 and 5. Those elements of this arrangement which correspond to those of FIG. 1 are designated by the same reference numerals. The left-hand portion of the diagram serves for producing the sparks and comprises again a step-up transformer 1 having a secondary winding 2 connected with a capacitor arrangement 3 and with the discharge electrodes 4 and 5. It also comprises the above described rotary spark-gap type commutator 6 and one adjustable inductance 8a. For the purpose of simplification of the illustration the motor 15 which drives the rotary portion 6a of the commutator 6 at 1500 r.p.m. is not shown, and the same applies to the index 13 and graduation 14 provided for setting the position of the frame 12.

In the right-hand portion of the FIG. 2 the elements are shown which serve for producing an arc discharge. This portion of the arrangement is supplied directly from the general energy supply with alternating current at 50 cycles, without the interposition of a transformer. Two high power diodes 16a and 16b selectable by a manually operable change-over switch 17 determine the polarity of the arc to be produced across the electrodes 4 and 5 and are connected for charging a variable capacitor 18 with each alternation of the supply current at the selected polarity. The intensity of the arc is regulated by a variable resistor 19. The ignition of the arc is performed by a high frequency low-power spark derived inductively from a winding 8b inductively coupled with the inductance 8a so that the two windings 8a and 8b constitute a high voltage transformer 20. The arc generating circuit is separated from the spark generating circuit in view of the high frequency by a filter arrangement, comprising two inductances 21a and two capacitors 22. Two other inductances 21b may be arranged in the manner illustrated in order to prevent the high frequency from affecting the supply network across the transformer 1.

In the same manner as in the above described first embodiment the rotary spark gap type commutator 6 is operated and connected in the manner of a normal distributing commutator. Whenever the rotating electrodes 10 are located opposite the stationary electrodes 11a the discharge electrodes 4 and 5 are connected via the commutator 6 with the spark generator and a high frequency spark will form between the electrodes 4 and 5 with a duration which depends upon the value of the inductance 8a. After a quarter turn of the disc 6a the electrodes 10 assume a position facing the electrodes 11b and the discharge electrodes 4 and 5 are placed in circuit with the winding 8b of the transformer 20. Depending upon the position of the change-over switch 17 for connecting either the diode 16a or the diode 16b in the circuit, the corresponding alternation of the 50 cycle supply voltage will pass therethrough and the condenser 18 is charged so that the high frequency low power spark jumping across the electrodes 4 and 5 starts the arc discharge the intensity thereof is adjusted by the variable resistor 19. It is to be noted that during the original high frequency discharge i.e. at the moment when the electrodes 10 face the electrodes 11a, the arc does not form yet although the arc generator remains continuously connected with the electrodes 4 and 5 because the polarity of the supply voltage is inverted and the diode 16a (or 16b depending upon which is chosen) is not yet conductive.

In view of the above one obtains between the discharge electrodes 4 and 5 alternatingly a high voltage spark discharge and an arc discharge which follow each other at intervals of 1/100 of a second.

It will be understood that each of the elements described above, or two or more together, may also find a useful application in other types of a method and apparatus for producing radiation for spectrometric analysis of a material differing from the types described above.

While the invention has been illustrated and described as embodied in a method and apparatus for producing radiation for spectrometric analysis of a material by means of electric discharges between electrodes comprising said material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for producing radiation for spectrometric analysis of a material by means of electric discharges between electrodes, in combination, input means for applying to the electrodes an alternating voltage of predetermined frequency and adapted to produce discharges between said electrodes; circuit means arranged between said input means and said electrodes and comprising a plurality of impedance means of respectively different impedance values, and control means for sequentially and in periodic repetition connecting in circuit with said electrodes different valued ones of said impedance means; and actuating means for actuating said control means in synchronism with said predetermined frequency of said alternating voltage, so that the different types of said electric discharges corresponding to different impedances form a sequence which is periodically repeated.

2. In an apparatus for producing radiation by means of electric discharges between electrodes comprising material to be spectrometrically analyzed, in combination, input means for applying to the electrodes an alternating voltage of predetermined frequency and adapted to produce discharges between said electrodes; circuit means arranged between said input means and said electrodes and comprising a plurality of impedance means of respectively different impedance values, and rotary commutator means for sequentially and in periodic repetition connecting in circuit with said electrodes different valued ones of said impedance means; and actuating means for rotating said rotary commutator means in synchronism with said predetermined frequency of said alternating voltage, so that the different types of said electric discharges corresponding to different impedances form a sequence which is periodically repeated.

3. In an apparatus for producing radiation by means of electric discharges between electrodes comprising material to be spectrometrically analyzed, in combination, input means for applying to the electrodes an alternating voltage of predetermined frequency and adapted to produce discharges between said electrodes; circuit means arranged between said input means and said electrodes and comprising a plurality of impedance means of respectively different impedance values, and rotary commutator means for sequentially and in periodic repetition connecting in circuit with said electrodes different valued ones of said impedance means, said rotary commutator means comprising rotary spark gap means capable of establishing in different positions thereof paths for electric energy between said input means and said electrodes across correspondingly different ones of said impedance means; and actuating means for rotating said rotary commutator means in synchronism with said predetermined frequency of said alternating voltage, so that the different types of said electric discharges corresponding to different impedances form a sequence which is periodically repeated.

4. An apparatus as claimed in claim 3, wherein said input means include means for applying to said electrodes alternating voltage from at least two sources of electrical energy having different electrical impedances, and wherein said commutator means are connected for applying to said electrodes electric energy from sources having different electrical parameters periodically in respectively different positions of said commutator means.

References Cited by the Examiner
UNITED STATES PATENTS

| | | | |
|---|---|---|---|
| 1,971,215 | 8/1934 | Feussner | 315—237 |
| 2,414,363 | 1/1947 | Dietert et al. | 315—224 X |
| 2,417,489 | 2/1947 | Hasler et al. | 315—237 |

JOHN W. HUCKERT, *Primary Examiner.*

D. O. KRAFT, *Assistant Examiner.*